US012769646B2

(12) United States Patent
Kim et al.

(10) Patent No.: US 12,769,646 B2
(45) Date of Patent: Oct. 20, 2026

(54) ARTIFICIAL NEURAL NETWORK PROCESSING ACCELERATOR BASED ON SYSTOLIC ARRAY AND METHOD FOR DATA REARRANGEMENT THEREIN

(71) Applicant: ELECTRONICS AND TELECOMMUNICATIONS RESEARCH INSTITUTE, Daejeon (KR)

(72) Inventors: Hyun-Mi Kim, Daejeon (KR); Chun-Gi Lyuh, Daejeon (KR)

(73) Assignee: ELECTRONICS and TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/999,113

(22) Filed: Dec. 23, 2024

(65) Prior Publication Data

US 2025/0217277 A1 Jul. 3, 2025

(30) Foreign Application Priority Data

Dec. 27, 2023 (KR) ........................ 10-2023-0192426
Dec. 16, 2024 (KR) ........................ 10-2024-0186634

(51) Int. Cl.
*G06F 12/02* (2006.01)
*G06F 12/06* (2006.01)
(Continued)

(52) U.S. Cl.
CPC ........... *G06F 12/023* (2013.01); *G06N 3/063* (2013.01); *G06F 12/0238* (2013.01);
(Continued)

(58) Field of Classification Search
CPC .. G06F 12/023; G06F 3/0613; G06F 12/0238; G06F 12/0653; G06F 15/17375;
(Continued)

(56) References Cited

U.S. PATENT DOCUMENTS 10,346,093 B1 * 7/2019 Wu ..................... G06F 13/1684
11,263,170 B1 * 3/2022 Nama ................. G06F 15/7885
(Continued)

FOREIGN PATENT DOCUMENTS

KR 10-2019-0030564 A 3/2019
KR 10-2272518 B1 7/2021
(Continued)

OTHER PUBLICATIONS

Z. Wu, Y. Liu, N. Li, H. Cao and H. Wang, "An Agile Design Method for Reconfigurable Spatial Accelerators in Tensor Computation," 2025 International Symposium of Electronics Design Automation (ISEDA), Hong Kong, China, 2025, pp. 35-40 (Year: 2025).*

*Primary Examiner* — Reginald G Bragdon
*Assistant Examiner* — Zakaria Mohammed Belkhayat
(74) *Attorney, Agent, or Firm* — Sughrue Mion, PLLC

(57) ABSTRACT

Disclosed herein is an artificial neural network processing accelerator based on a systolic array. The artificial neural network processing accelerator based on a systolic array includes a processing element array, internal memory for storing input/output data of the processing element array, and a data flow control unit for performing control to deliver an input tensor and weight data from the internal memory to the processing element array in each operation cycle and to store an output tensor from the processing element array in the internal memory. The internal memory may include N memory banks respectively corresponding to N rows of the processing element array and further include a rearrange-
(Continued)

ment interface for connecting input/output between the N rows of the processing element array and the N memory banks.

18 Claims, 5 Drawing Sheets

(51) Int. Cl.
*G06F 15/173* (2006.01)
*G06N 3/063* (2023.01)
*G06F 15/76* (2006.01)
*G06F 17/16* (2006.01)

(52) U.S. Cl.
CPC .... *G06F 12/0653* (2013.01); *G06F 15/17381* (2013.01); *G06F 15/76* (2013.01); *G06F 17/16* (2013.01)

(58) Field of Classification Search
CPC ................. G06F 17/16; G06F 12/0223; G06F 15/17343; G06F 15/8046; G06F 15/17381; G06F 2212/657; G06N 3/063
See application file for complete search history.

(56) References Cited

U.S. PATENT DOCUMENTS

| | | | | |
|---|---|---|---|---|
| 11,748,253 | B1 * | 9/2023 | Hariharan | G06F 12/1081 711/154 |
| 2018/0246669 | A1 * | 8/2018 | Redfern | G06F 3/0647 |
| 2018/0365561 | A1 * | 12/2018 | Temam | G06N 3/063 |
| 2019/0079801 | A1 | 3/2019 | Lyuh et al. | |
| 2019/0164037 | A1 | 5/2019 | Kim et al. | |
| 2021/0124524 | A1 | 4/2021 | Franca-Neto et al. | |
| 2021/0158132 | A1 * | 5/2021 | Huynh | G06N 3/0464 |
| 2022/0164192 | A1 * | 5/2022 | Lyuh | G06F 9/355 |
| 2022/0180192 | A1 | 6/2022 | Kim | |
| 2023/0177310 | A1 | 6/2023 | Kwon et al. | |
| 2023/0205729 | A1 * | 6/2023 | Gu | G06F 15/8046 712/10 |

FOREIGN PATENT DOCUMENTS

| | | | |
|---|---|---|---|
| KR | 10-2022-0081264 | A | 6/2022 |
| KR | 10-2023-0086584 | A | 6/2023 |
| WO | 2023004570 | A1 | 2/2023 |

* cited by examiner

ARTIFICIAL NEURAL NETWORK PROCESSING ACCELERATOR BASED ON SYSTOLIC ARRAY AND METHOD FOR DATA REARRANGEMENT THEREIN

CROSS REFERENCE TO RELATED APPLICATIONS

This application claims the benefit of Korean Patent Applications No. 10-2023-0192426, filed Dec. 27, 2023, and No. 10-2024-0186634, filed Dec. 16, 2024, which are hereby incorporated by reference in their entireties into this application.

BACKGROUND OF THE INVENTION

1. Technical Field

The disclosed embodiment relates to an artificial neural network processing accelerator with a systolic array structure.

2. Description of the Related Art

With the development of Artificial Intelligence (AI) algorithms, artificial neural network processing accelerators for more efficiently processing AI algorithms have also been developed.

Among such accelerators, systolic-array-structure-based accelerators include a Convolutional Neural Network (CNN) and are widely used as architecture suitable to efficiently process the most computationally intensive operations in AI algorithms.

Meanwhile, artificial neural network accelerators are fundamentally configured to process data layer by layer, and the size of an input tensor of each layer may differ from the size of an output tensor thereof due to the stride parameters of a pooling layer or a convolution layer.

Therefore, the operation of rearranging the output tensor of a layer stored in internal memory included in the systolic-array-structure-based accelerator to fit the input of the subsequent layer should be added.

Such data rearrangement is performed by transferring the tensor in the internal memory to high-capacity external memory to be stored therein and loading the same back into the internal memory. However, access to external memory causes high latency, which degrades artificial neural network processing performance.

SUMMARY OF THE INVENTION

An object of the disclosed embodiment is to prevent the latency caused due to data rearrangement between the layers of an artificial neural network from degrading artificial neural network processing performance in an accelerator based on a systolic array structure for accelerating artificial neural network processing.

An artificial neural network processing accelerator based on a systolic array according to an embodiment includes a processing element array, internal memory for storing input/output data of the processing element array, and a data flow control unit for performing control to deliver an input tensor and weight data from the internal memory to the processing element array in each operation cycle and to store an output tensor from the processing element array in the internal memory. The internal memory may include N memory banks respectively corresponding to N rows of the processing element array and may further include a rearrangement interface for connecting input/output between the N rows of the processing element array and the N memory banks.

The artificial neural network processing accelerator based on a systolic array according to an embodiment may further include a data movement unit for copying artificial neural network input data and weight data from external memory to the internal memory.

Here, the rearrangement interface may include N−1 multiplexers, the k-th multiplexer may input the input tensors output from the k-th memory bank and the (k+1)-th memory bank to the k-th row of the processing element array, and the input tensor output from the N-th memory bank may be input to the N-th row of the processing element array.

Here, the rearrangement interface may include N−1 multiplexers, the output tensor output from the first row of the processing element array may be input to the first memory bank, and the k-th multiplexer may input the output tensors output from the k-th row of the processing element array and the (k+1)-th row of the processing element array to the (k+1)-th memory bank.

Here, the data flow control unit may generate an internal memory address value corresponding to the data to be read from the internal memory in each operation cycle and generate an internal memory address value to which output data from the processing element array is to be written.

Here, the data flow control unit may generate an address for the internal memory in each operation cycle based on a register file generated in advance by a compiler based on a target artificial neural network.

Here, the register file may include the start address of an input tensor, a loop offset, information about a loop for generating a Y coordinate, and information about the slice height of the input tensor.

Here, the data flow control unit may perform generating an initial address value for the internal memory based on a nested loop, extracting the Y coordinate of a tensor based on the information about the loop for generating a Y coordinate, and generating a final address value for the internal memory for connecting the input/output between the N rows of the processing element array and the N memory banks based on a result of comparing the extracted Y coordinate with the slice height of the tensor.

Here, when generating the final address value, the data flow control unit may set the initial address value as the final address value when the extracted Y coordinate is less than the slice height of the tensor.

Here, when generating the final address value, the data flow control unit may set the final address value by subtracting a Z-direction address offset from the initial address value when the extracted Y coordinate is greater than the slice height of the tensor.

A method for data rearrangement in an artificial neural network processing accelerator based on a systolic array according to an embodiment may include generating an initial address value for internal memory based on a nested loop, extracting the Y coordinate of a tensor based on information about a loop for generating a Y coordinate, generating a final address value for the internal memory based on a result of comparing the extracted Y coordinate with the slice height of the tensor, and connecting input/output between N rows of a processing element array and N memory banks through a rearrangement interface based on the final address value.

Here, generating the initial address value may comprise generating an address for the internal memory in each operation cycle based on a register file generated in advance by a compiler based on a target artificial neural network.

Here, the register file may include the start address of an input tensor, a loop offset, the information about the loop for generating a Y coordinate, and information about the slice height of the input tensor.

Here, the rearrangement interface may include N−1 multiplexers, the k-th multiplexer may input the input tensor output from at least one of the k-th memory bank, or the (k+1)-th memory bank, or a combination thereof to the k-th row of the processing element array, and the input tensor output from the N-th memory bank may be input to the N-th row of the processing element array.

Here, the rearrangement interface may include N−1 multiplexers, the output tensor output from the first row of the processing element array may be input to the first memory bank, the k-th multiplexer may input the output tensor output from at least one of the k-th row of the processing element array, or the (k+1)-th row of the processing element array, or a combination thereof to the (k+1)-th memory bank.

Here, generating the final address value may comprise setting the initial address value as the final address value when the extracted Y coordinate is less than the slice height of the tensor.

Here, generating the final address value may comprise setting the final address value by subtracting a Z-direction address offset from the initial address value when the extracted Y coordinate is greater than the slice height of the tensor.

An artificial neural network processing accelerator based on a systolic array according to an embodiment includes a processing element array, internal memory for storing input/output data of the processing element array, and a data flow control unit for performing control to deliver an input tensor and weight data from the internal memory to the processing element array in each operation cycle and to store an output tensor from the processing element array in the internal memory. The internal memory may include N memory banks respectively corresponding to N rows of the processing element array and further include a rearrangement interface for connecting input/output between the N rows of the processing element array and the N memory banks, the data flow control unit may perform generating an initial address value for the internal memory based on a nested loop, extracting the Y coordinate of a tensor based on information about a loop for generating a Y coordinate, generating a final address value for the internal memory based on a result of comparing the extracted Y coordinate with the slice height of the tensor, and controlling the rearrangement interface based on the final address value.

Here, the rearrangement interface may include an input rearrangement interface and an output rearrangement interface, the input rearrangement interface may include N−1 multiplexers, the k-th multiplexer of the input rearrangement interface may input the input tensor output from at least one of the k-th memory bank, or the (k+1)-th memory bank, or a combination thereof to the k-th row of the processing element array, the input tensor output from the N-th memory bank may be input to the N-th row of the processing element array, the output rearrangement interface may include N−1 multiplexers, the output tensor output from the first row of the processing element array may be input to the first memory bank, and the k-th multiplexer of the output rearrangement interface may input the output tensor output from at least one of the k-th row of the processing element array, or the (k+1)-th row of the processing element array, or a combination thereof to the (k+1)-th memory bank.

Here, when generating the final address value, the data flow control unit may set the initial address value as the final address value when the extracted Y coordinate is less than the slice height of the tensor; and may set the final address value by subtracting a Z-direction address offset from the initial address value when the extracted Y coordinate is greater than the slice height of the tensor.

BRIEF DESCRIPTION OF THE DRAWINGS

The above and other objects, features, and advantages of the present disclosure will be more clearly understood from the following detailed description taken in conjunction with the accompanying drawings, in which.

DESCRIPTION OF THE PREFERRED EMBODIMENTS

Figure 1:
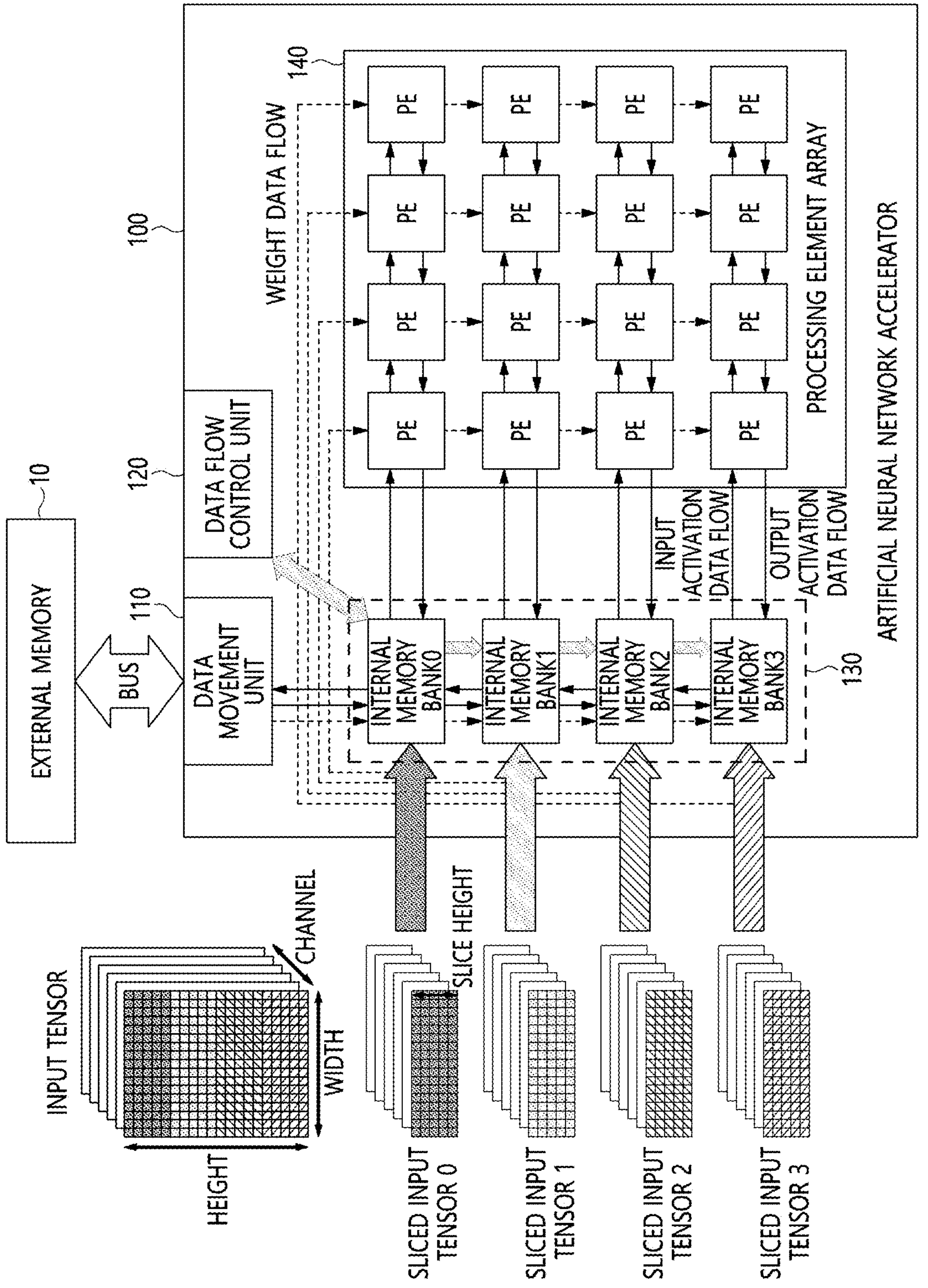
FIG. 1 is an internal configuration diagram of a general systolic-array-based artificial neural network processing accelerator.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms “first,” “second,” etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms “comprises,” “comprising,”, “includes” and/or “including,” when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

FIG. 1 is an internal configuration diagram of a general systolic-array-based artificial neural network processing accelerator.

Referring to FIG. 1, the general systolic-array-based artificial neural network processing accelerator 100 may include a data movement unit 110, a data flow control unit 120, internal memory 130, and a processing element array 140.

The data movement unit 110 copies artificial neural network input data and weight data from large-capacity external memory 10 to the on-chip internal memory 130.

The internal memory 130 may store the artificial neural network input data and weight data copied from the large-capacity external memory 10 and may store data output from the processing element array 140.

Here, the internal memory 130 may contain N memory banks respectively corresponding to N rows of the processing element array 140 (N being a positive integer).

For example, because the processing element array 140 in FIG. 1 is configured with processing elements arranged in 4×4, the internal memory 130 may include four memory banks respectively corresponding to the four rows of the processing element array 140.

The data flow control unit 120 may perform control to deliver an input tensor and weight data required for each operation cycle from the internal memory 130 to the processing element array 140 and to store an output tensor in the internal memory 130 after the operation in the processing element array 140 is completed.

Here, in order to utilize the processing element array 140 with high parallelism, the 3D input tensor may be sliced in a vertical direction and stored in the internal memory 130.

That is, the data movement unit 110 may load each of the sliced input tensors from the external memory 10 and allocate the same to each of the banks of the internal memory 130 to be stored therein, as illustrated in FIG. 1.

Accordingly, each row of the processing element array 140 processes the sliced input tensor allocated thereto according to a systolic structure.

The above-described systolic-array-based artificial neural network accelerator 100 increases the data reuse rate in the high-speed internal memory 130 in order to process artificial neural network layers, such as convolution layers, and the high-performance artificial neural network accelerator may be configured by controlling data flow for the processing element array 140.

That is, high-performance accelerators capable of layer fusion have also been developed by applying not only Multiply and Accumulate (MAC) units required for matrix calculation but also a structure enabling activation and pooling in the internal structure of the processing element array 140.

Artificial neural network accelerators are fundamentally configured to process data layer by layer, and the size of the input tensor of each layer may differ from the size of the output tensor thereof due to the stride parameter of a pooling layer or a convolution layer.

Accordingly, sliced input tensors, the sizes of which vary for each layer, may be allocated to the banks of the internal memory 130.

Accordingly, the operation of rearranging tensors in the respective banks should be added such that the size of the output tensor of the currently processed layer stored in the banks of the internal memory 130 illustrated in FIG. 1 matches the size of the input tensor of the subsequent layer to be processed.

Such data rearrangement is performed in such a way that the tensor stored in the internal memory 130 is transferred to the large-capacity external memory 10 and rearranged therein and is then loaded back into the internal memory 130. However, access to the external memory 10 for this process increases latency, which results in degradation in the overall artificial neural network processing performance.

Therefore, the disclosed embodiment provides an apparatus and method capable of rearranging data between artificial neural network layers in the on-chip memory of a systolic-array-based accelerator for accelerating artificial neural network processing. Accordingly, artificial neural network operation is quickly performed without additional data processing time, whereby processing performance may be improved.

Figure 2:
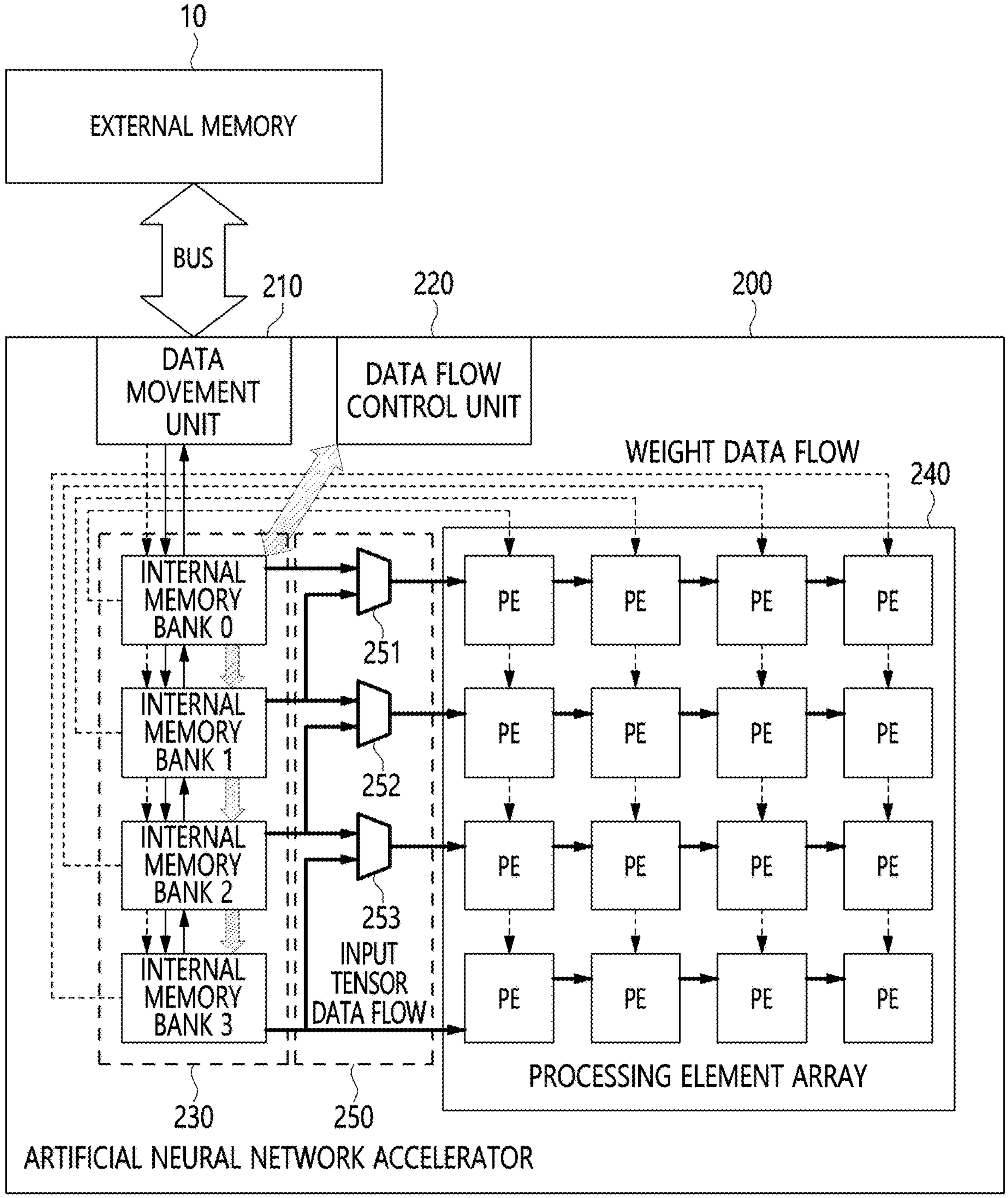
FIGS. 2 and 3 are internal configuration diagrams of an artificial neural network processing accelerator based on a systolic array according to an embodiment.
Figure 3:
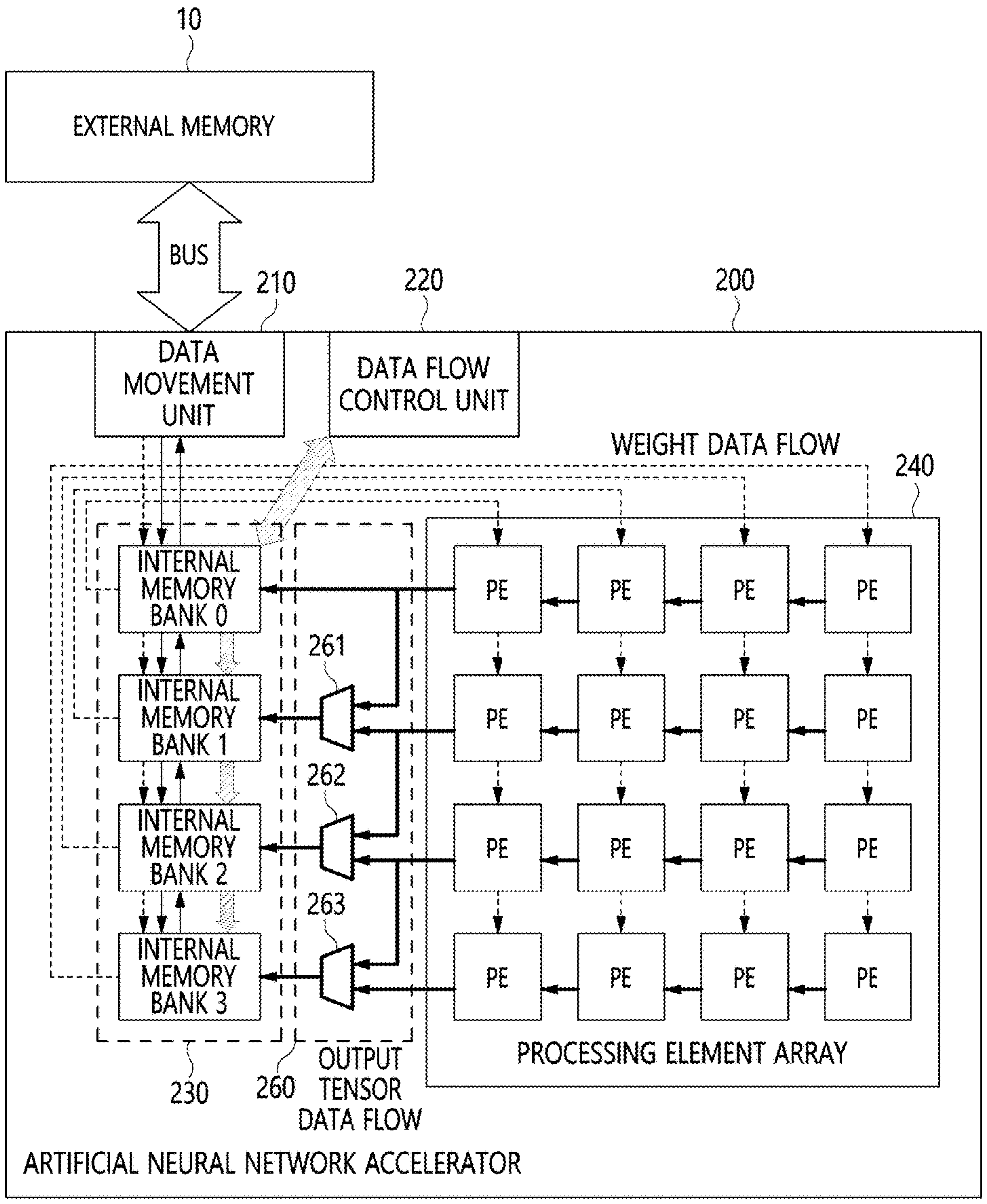

FIGS. 2 and 3 are internal configuration diagrams of a systolic-array-based artificial neural network processing accelerator according to an embodiment.

Referring to FIGS. 2 and 3, the systolic-array-based artificial neural network processing accelerator 200 according to an embodiment may include a data movement unit 210, a data flow control unit 220, internal memory 230, a processing element array 240, and rearrangement interfaces 250 and 260.

Because the operations and internal structures of the data movement unit 210, the internal memory 230, and the processing element array 240 are the same as those of the components illustrated in FIG. 1, a detailed description thereof will be omitted.

Comparing the configuration with that illustrated FIG. 1, the systolic-array-based artificial neural network processing accelerator 200 according to an embodiment may further include the rearrangement interfaces 250 and 260.

The rearrangement interfaces 250 and 260 according to an embodiment may connect the input/output between N rows of the processing element array 240 and N memory banks of the internal memory 230 (N being a positive integer).

The rearrangement interfaces 250 and 260 may include the input rearrangement interface 250 and the output rearrangement interface 260 according to an embodiment.

Referring to FIG. 2, the input rearrangement interface 250 may include N−1 multiplexers 251, 252, and 253.

Here, the k-th multiplexer inputs the input tensor output from at least one of the k-th memory bank, or the (k+1)-th memory bank, or a combination thereof to the k-th row of the processing element array 240.

For example, each of the multiplexers 251, 252, and 253 may load data from the internal memory bank in the same row as the multiplexer and the internal memory bank in the next row and may input the data to the processing elements in the same row as the multiplexer as the input tensor, as illustrated in FIG. 2.

Also, the input tensor output from the N-th memory bank may be input to the N-th row of the processing element array 240.

Referring to FIG. 3, the output rearrangement interface 260 may include N−1 multiplexers 261, 262, and 263.

Here, the output tensor output from the first row of the processing element array 240 is input to the first memory bank.

Also, the k-th multiplexer may input the output tensor output from at least one of the k-th row of the processing element array 240, or the (k+1)-th row of the processing element array, or a combination thereof to the (k+1)-th memory bank.

That is, the output data of the processing element may be stored not only in the memory bank in the same row as the processing element but also in the memory bank in the row immediately below.

Meanwhile, the data flow control unit 220 according to an embodiment generates an internal memory address corresponding to the data to be read from the internal memory 230 in each operation cycle, reads the data from the corresponding address in the internal memory 230, and supplies the data to the processing element array 240.

Also, the data flow control unit 220 according to an embodiment generates an internal memory address for writing the output data from the processing element array 240 and writes the output data from the processing element array to the corresponding address in the internal memory 230.

Figure 4:
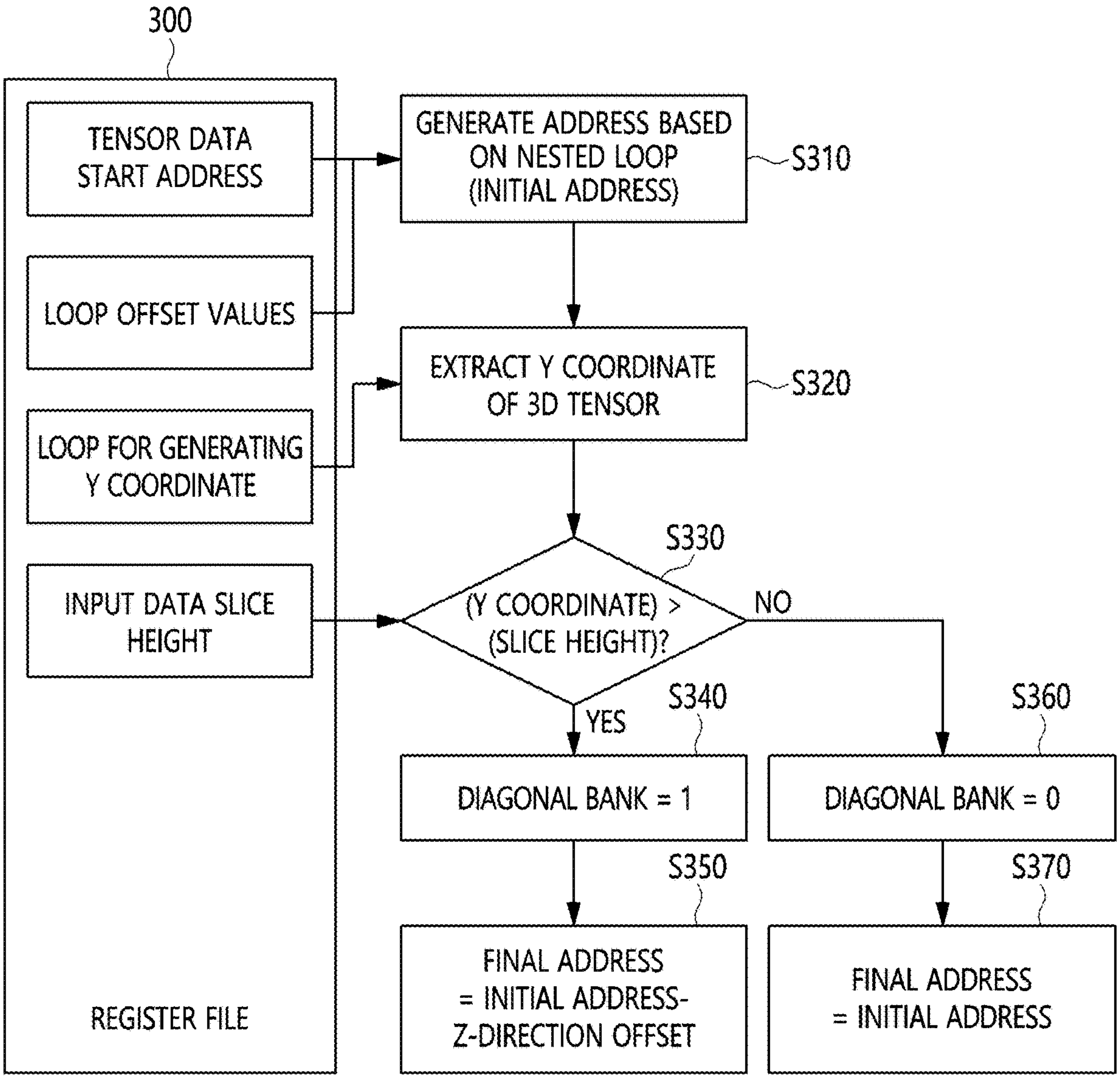
FIG. 4 is a flowchart for explaining a method for data rearrangement in an artificial neural network processing accelerator based on a systolic array according to an embodiment.

FIG. 4 is a flowchart for explaining a method for data rearrangement in an artificial neural network processing accelerator based on a systolic array according to an embodiment.

Referring to FIG. 4, the data flow control unit 220 according to an embodiment may generate an address for the internal memory 230 in each operation cycle based on a register file 300 that is generated in advance by a compiler based on a target artificial neural network.

Here, the register file 300 may include the start address of an input tensor, loop offset values, information about a loop for generating a Y coordinate, and information about the slice height of the input tensor.

Here, the register file 300 is generated in advance by a compiler based on the target artificial neural network and is a value set by a dedicated protocol for delivering compiler information to the accelerator before execution of the accelerator.

That is, the compiler has a function to analyze the configuration of the artificial neural network and extract information thereabout before running the accelerator and generates commands for writing the extracted information to the register file 300 through an accelerator-specific command.

Here, for input tensor data, information to be stored in the register file 300 may be extracted from the input tensor of the layer that has to be currently processed and slice tensors allocated to the respective banks of the internal memory 230.

Also, for output tensor data, information to be stored in the register file 300 may be extracted from the input tensor of the layer that has to be subsequently processed and slice tensors allocated to the respective banks of the internal memory 230.

The data flow control unit 220 includes a nested-loop-based address generation unit (not illustrated). Here, through the nested-loop-based address generation unit, an address for the internal memory 230 in which the data output in each cycle is to be written is automatically generated based on a data start address, the iteration count for each loop in the nested loop, and the offset added to the address for each iteration of the loop, among the pieces of data in the register file 300.

Referring to FIG. 4, the data flow control unit 220 generates an initial address value for the internal memory 230 based on the nested loop by using the tensor data start address and the loop offset values in the register file 300 at step S310.

Then, the data flow control unit 220 extracts the Y coordinate of the tensor based on the information about the loop for generating a Y coordinate at step S320. Here, in order to extract the address value corresponding to the location in the Y direction in the address generated in each cycle, the value indicating the loop for extracting the location in the Y direction, among the loops, is identified by referring to the register file 300, and the Y coordinate is extracted using the value.

Also, the data flow control unit 220 generates a final address for the internal memory based on a result of comparing the extracted Y coordinate and the slice height of the tensor at steps S330 to S370.

That is, when the extracted Y coordinate is greater than the slice height of the tensor at step S330, the data flow control unit 220 generates '1' as a diagonal bank signal to represent the input/output tensor data flow to the memory bank in the next row at step S340. Then, the data flow control unit 220 may set the final address value by subtracting the Z-direction address offset from the initial address value at step S350.

Conversely, when the extracted Y coordinate is less than the slice height of the tensor at step S330, '0' is generated as the diagonal bank signal to represent the input/output tensor data flow to the memory bank in the same row at step S360. Then, the data flow control unit 220 may set the initial address value as the final address value at step S370.

Accordingly, the data flow control unit 220 may perform control to connect the input/output between the N rows of the processing element array 240 and the N memory banks by controlling the rearrangement interfaces 250 and 260 based on the diagonal bank signal and the set final address value.

For example, when the diagonal bank signal set to '0' is input, the multiplexer 251 illustrated in FIG. 2 may deliver input tensor data from internal memory bank 0 to the processing element in the first row.

When the diagonal bank signal set to '1' is input, the multiplexer 251 illustrated in FIG. 2 may deliver input tensor data from internal memory bank 1 to the processing element in the first row.

That is, the extracted diagonal bank signal and the final address signal are delivered in a systolic manner to the logic units for controlling the internal memory banks.

Figure 5:
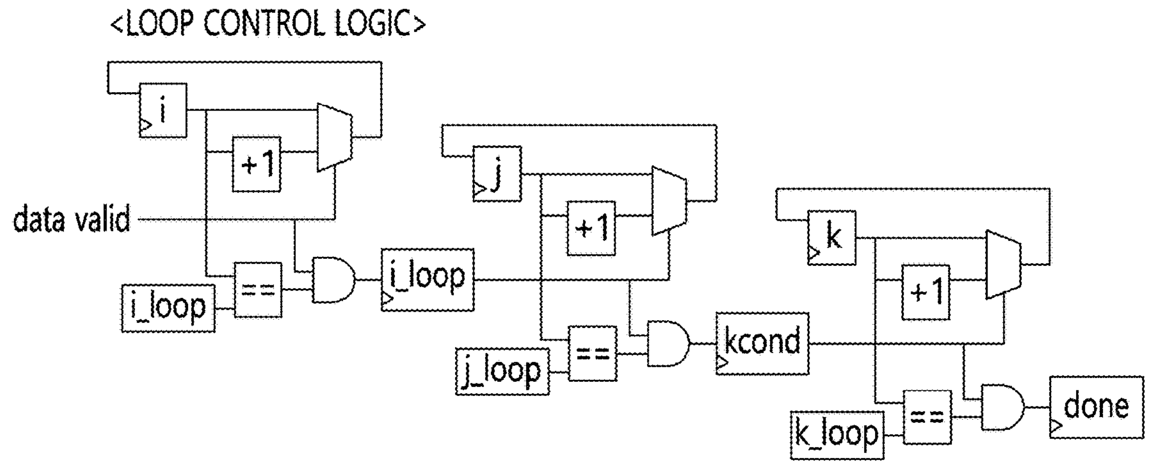
FIGS. 5 and 6 are exemplary views of address generation logic based on a 3D nested loop.
Figure 6:
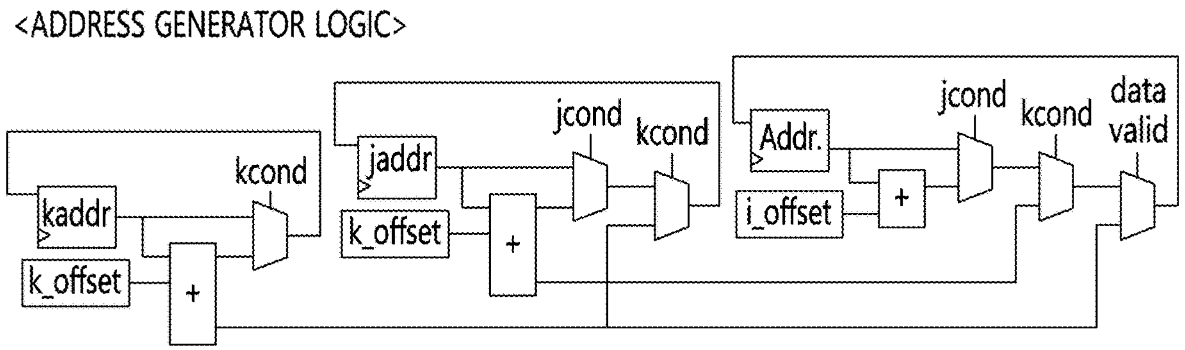

FIGS. 5 and 6 are exemplary views of address generation logic based on a 3D nested loop.

The address generation logic based on a 3D nested loop according to an embodiment is configured with two sub-blocks including the loop control logic illustrated in FIG. 5 and the address generation logic illustrated in FIG. 6.

The loop control logic generates jcond and kcond values depending on a data valid signal indicating whether the data generated in the processing element array 240 is valid in each cycle and delivers the values to the address generation logic.

The address generation logic receives the data valid signal, jcond, and kcond and generates an input/output address (Addr) for the internal memory.

The structure of the logic illustrated in FIGS. 5 and 6 is an expandable structure enabling the configuration of a higher-dimensional nested loop.

By controlling data flow through the rearrangement interface according to the above-described embodiment, data can be rearranged through only operations of reading or writing data for processing, without additional operations or large hardware resources, whereby a high-performance artificial neural network processing accelerator may be implemented.

Also, because only a data path to the memory bank of the row immediately below is added in the rearrangement interface, hardware implementation that is feasible even at high operation frequencies may be enabled.

According to the disclosed embodiment, the latency caused due to data rearrangement between the layers of an artificial neural network may be prevented from degrading artificial neural network processing performance in an accelerator based on a systolic array structure for accelerating artificial neural network processing.

What is claimed is:

1. An artificial neural network processing accelerator based on a systolic array, comprising:

a processing element array including N rows of processing elements; and internal memory for storing input/output data of the processing element array, wherein the internal memory includes N memory banks respectively corresponding to the N rows of the processing element array, and a rearrangement interface configured to connect input/output between the N rows of the processing element array and the N memory banks, and wherein the artificial neural network processing accelerator is configured to execute one or more instructions to:

generate an initial address value for the internal memory based on a nested loop;

extract a Y coordinate of a tensor based on information about a loop for generating the Y coordinate; and generate a final address value for the internal memory for connecting the input/output between the N rows of the processing element array and the N memory banks based on a result of comparing the extracted Y coordinate with a slice height of the tensor.

2. The artificial neural network processing accelerator of claim 1, wherein the artificial neural network processing accelerator is further configured to execute the one or more instructions to:

copy artificial neural network input data and weight data from external memory to the internal memory.

3. The artificial neural network processing accelerator of claim 1, wherein the rearrangement interface includes N−1 multiplexers, an output tensor output from a first row of the processing element array is input to a first memory bank, and a k-th multiplexer inputs an output tensor output from at least one of a k-th row of the processing element array, or a (k+1)-th row of the processing element array, or a combination thereof to a (k+1)-th memory bank.

4. The artificial neural network processing accelerator of claim 1, wherein the artificial neural network processing accelerator is further configured to execute the one or more instructions to:

generate an internal memory address value corresponding to data to be read from the internal memory in each operation cycle and generate an internal memory address value to which output data from the processing element array is to be written.

5. The artificial neural network processing accelerator of claim 4, wherein the artificial neural network processing accelerator is further configured to execute the one or more instructions to:

generate an address for the internal memory in each operation cycle based on a register file generated in advance by a compiler based on a target artificial neural network.

6. The artificial neural network processing accelerator of claim 5, wherein the register file includes a start address of an input tensor, a loop offset, information about a loop for generating the Y coordinate, and information about a slice height of the input tensor.

7. The artificial neural network processing accelerator of claim 1, wherein, when generating the final address value, the artificial neural network processing accelerator is further configured to set the initial address value as the final address value when the extracted Y coordinate is less than the slice height of the tensor.

8. The artificial neural network processing accelerator of claim 1, wherein, when generating the final address value, the artificial neural network processing accelerator is further configured to set the final address value by subtracting a Z-direction address offset from the initial address value when the extracted Y coordinate is greater than the slice height of the tensor.

9. The artificial neural network processing accelerator of claim 1, wherein the rearrangement interface includes N−1 multiplexers, a k-th multiplexer inputs an input tensor output from at least one of a k-th memory bank, or a (k+1)-th memory bank, or a combination thereof to a k-th row of the processing element array, and an input tensor output from an N-th memory bank is input to an N-th row of the processing element array.

10. An artificial neural network processing accelerator based on a systolic array, comprising:

a processing element array including N rows of processing elements; and internal memory for storing input/output data of the processing element array, wherein the internal memory includes N memory banks respectively corresponding to the N rows of the processing element array, and a rearrangement interface configured to connect input/output between the N rows of the processing element array and the N memory bank, wherein the rearrangement interface includes N−1 multiplexers, a k-th multiplexer inputs an input tensor output from at least one of a k-th memory bank, or a (k+1)-th memory bank, or a combination thereof to a k-th row of the processing element array, and an input tensor output from an N-th memory bank is input to an N-th row of the processing element array.

11. The artificial neural network processing accelerator of claim 10, wherein the rearrangement interface further includes N−1 multiplexers, an output tensor output from a first row of the processing element array is input to a first memory bank, and a k-th multiplexer inputs an output tensor output from at least one of a k-th row of the processing element array, or a (k+1)-th row of the processing element array, or a combination thereof to a (k+1)-th memory bank.

12. A method for data rearrangement in an artificial neural network processing accelerator based on a systolic array, comprising:

generating an initial address value for internal memory based on a nested loop;

extracting a Y coordinate of a tensor based on information about a loop for generating the Y coordinate;

generating a final address value for the internal memory based on a result of comparing the extracted Y coordinate with a slice height of the tensor; and connecting input/output between N rows of a processing element array and N memory banks through a rearrangement interface based on the final address value.

13. The method of claim 12, wherein generating the initial address value comprises generating an address for the internal memory in each operation cycle based on a register file generated in advance by a compiler based on a target artificial neural network.

14. The method of claim 13, wherein the register file includes a start address of an input tensor, a loop offset, the information about the loop for generating the Y coordinate, and information about a slice height of the input tensor.

15. The method of claim 12, wherein the rearrangement interface includes N−1 multiplexers, a k-th multiplexer inputs an input tensor output from at least one of a k-th memory bank, or a (k+1)-th memory bank, or a combination thereof to a k-th row of the processing element array, and an input tensor output from an N-th memory bank is input to an N-th row of the processing element array.

16. The method of claim 12, wherein the rearrangement interface includes N−1 multiplexers, an output tensor output from a first row of the processing element array is input to a first memory bank, a k-th multiplexer inputs an output tensor output from at least one of a k-th row of the processing element array, or a (k+1)-th row of the processing element array, or a combination thereof to a (k+1)-th memory bank.

17. The method of claim 12, wherein generating the final address value comprises setting the initial address value as the final address value when the extracted Y coordinate is less than the slice height of the tensor.

18. The method of claim 12, wherein generating the final address value comprises setting the final address value by subtracting a Z-direction address offset from the initial address value when the extracted Y coordinate is greater than the slice height of the tensor.

* * * * *